US012686269B2

(12) United States Patent
Daul

(10) Patent No.: US 12,686,269 B2
(45) Date of Patent: Jul. 21, 2026

(54) BACKLIT BUTTON ASSEMBLY

(71) Applicant: ITT Manufacturing Enterprises LLC, Stamford, CT (US)

(72) Inventor: Terrance E. Daul, Hamburg, NY (US)

(73) Assignee: ITT Manufacturing Enterprises LLC, Stamford, CT (US)

( * ) Notice: Subject to any disclaimer, the term of this patent is extended or adjusted under 35 U.S.C. 154(b) by 0 days.

(21) Appl. No.: 19/103,636

(22) PCT Filed: Sep. 27, 2023

(86) PCT No.: PCT/US2023/075181
§ 371 (c)(1),
(2) Date: Feb. 13, 2025

(87) PCT Pub. No.: WO2024/097480
PCT Pub. Date: May 10, 2024

(65) Prior Publication Data
US 2026/0061841 A1 Mar. 5, 2026

Related U.S. Application Data

(60) Provisional application No. 63/422,272, filed on Nov. 3, 2022.

(51) Int. Cl.
B60K 35/21 (2024.01)
F21V 23/04 (2006.01)

(52) U.S. Cl.
CPC ........ B60K 35/212 (2024.01); F21V 23/0407 (2013.01); B60K 2360/128 (2024.01)

(58) Field of Classification Search
CPC .............. B60K 35/212; F21V 23/0407; B64D 11/00155; B64D 11/06
USPC ...................... 362/23.5, 131, 488; 297/217.6
See application file for complete search history.

(56) References Cited

U.S. PATENT DOCUMENTS

| | | |
|---|---|---|
| 4,471,353 A | 9/1984 | Cernik |
| 2006/0203485 A1 | 9/2006 | Fu et al. |
| 2010/0176632 A1* | 7/2010 | Alford .............. B64D 11/06395 297/217.3 |
| 2016/0347453 A1 | 12/2016 | Ayyagari et al. |
| 2020/0019304 A1 | 1/2020 | Mead et al. |
| 2021/0051778 A1* | 2/2021 | McDonald .............. H05B 45/14 |
| 2022/0055751 A1* | 2/2022 | Hansson .............. B64D 11/0624 |

FOREIGN PATENT DOCUMENTS

JP          H07246130 A2          9/1995

OTHER PUBLICATIONS

International Search Report and Written Opinion for PCT Application No. PCT/US23/75181 mailed Jan. 3, 2024, pp. 9.

* cited by examiner

*Primary Examiner* — Thomas M Sember
(74) *Attorney, Agent, or Firm* — Turk IP Law, LLC

(57) ABSTRACT

A backlit button assembly is provided for aircraft, ship, train, or bus seats. The backlit button assembly may provide changing colors, flashing, or similar features to reflect status information associated with the seat, the vehicle, or other aspects. The button assembly may be combined with one or more sensors and/or communicatively coupled to a controller to detect statuses of the seat, vehicle, or passenger and activate a color change or flashing to reflect the status.

17 Claims, 9 Drawing Sheets

100A

104

106

102

300

306

308

302

304

500

502

512

510

508

506

504

BACKLIT BUTTON ASSEMBLY

CROSS-REFERENCE TO RELATED APPLICATIONS

This application is a U.S. National Stage filing under 35 U.S.C. § 371 of International Application PCT/US2023/075181, filed Sep. 27, 2023, which claims priority to U.S. Provisional Patent Application Ser. No. 63/422,272 filed on Nov. 3, 2022. The disclosures of the Provisional and PCT Applications are hereby incorporated by reference in their entirety.

BACKGROUND

Unless otherwise indicated herein, the materials described in this section are not prior art to the claims in this application and are not admitted as prior art by inclusion in this section.

Seats on aircrafts, ships, trains, buses, and similar vehicles may have a button assembly, for example, fitted to an arm of the seat to recline the seat. In conventional implementations, such buttons may be mechanical as the seats are typically wired for electricity or communications. In dark environments, for example, at nighttime, the buttons may be difficult to find for a passenger. Even when easily found, such buttons are single-function buttons while taking up valuable space on seat arms.

SUMMARY

The present disclosure generally describes cable-to-cable connector assemblies with various connections, shapes, and protective features.

With the advance of electronic and materials technologies, seats on aircrafts, ships, trains, buses, and similar vehicles are wired for increasingly additional functionalities such as power connectors for personal devices, displays, controls, etc. This increase in components makes available space on seat arms and other portions valuable. Thus, multi-functional components may add to functionality and user-friendliness of such seats.

According to some examples, a backlit button assembly is provided for aircraft, ship, train, or bus seats. The backlit button assembly may provide changing colors, flashing, or similar features to reflect status information associated with the seat, the vehicle, or other aspects. The button assembly may be combined with one or more sensors and/or communicatively coupled to a controller to detect statuses of the seat, vehicle, or passenger and activate a color change or flashing to reflect the status. According to other examples, the button assembly may include multiple buttons arranged together to form a shape of a logo or similar design, where the illumination may be provided by a strip between the buttons and a frame, along an outside perimeter of the frame, the buttons, and/or the frame itself.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1A:
FIG. 1A-1C illustrate example backlit button assembly configurations on an inside surface of an aircraft seat arm.
Figure 1A:
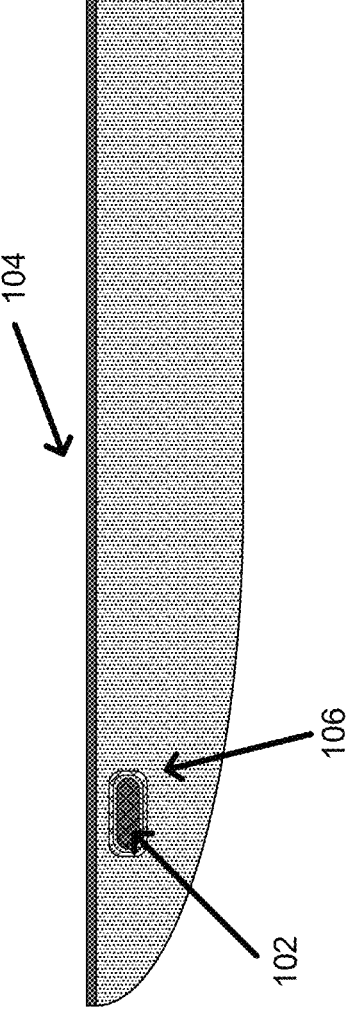

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods of manufacture, apparatus, systems and/or devices associated with backlit button assemblies in aircraft, ship, train, bus, and similar environments.

Disclosed herein are a backlit button assembly provided for aircraft, ship, train, or bus seats. The backlit button assembly may provide changing colors, flashing, or similar features to reflect status information associated with the seat, the vehicle, or other aspects. The button assembly may be combined with one or more sensors and/or communicatively coupled to a controller to detect statuses of the seat, vehicle, or passenger and activate a color change or flashing to reflect the status.

Figure 1B:
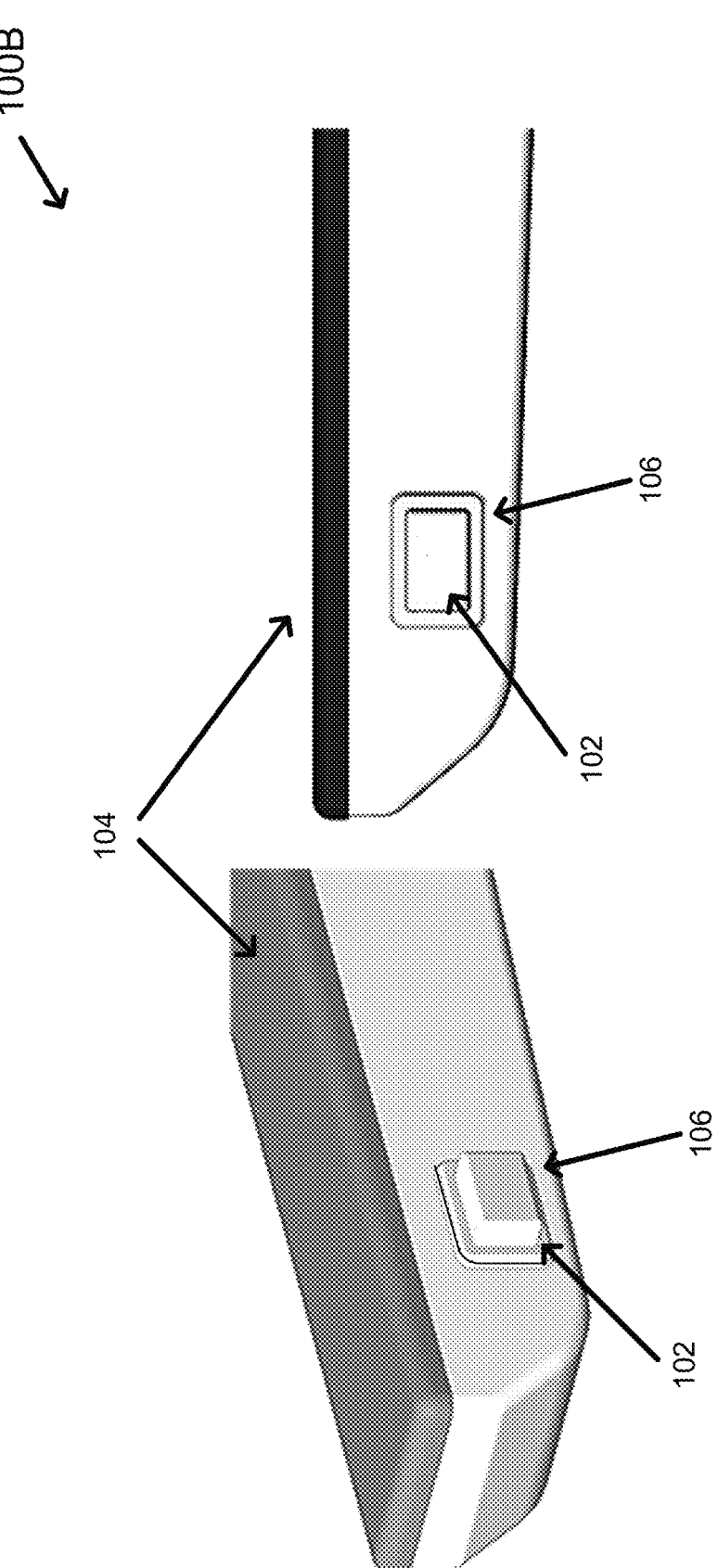
Figure 1C:
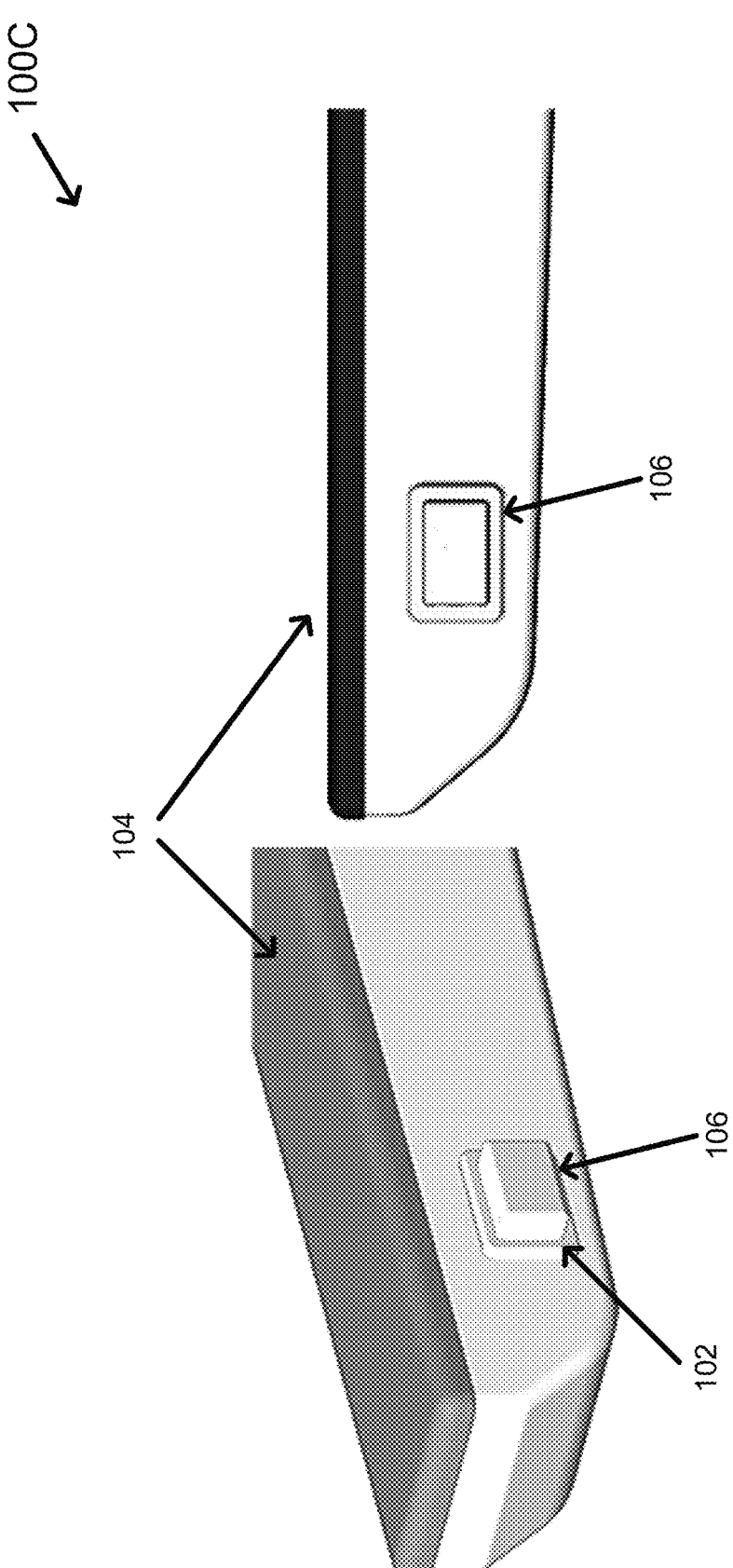

FIG. 1A-1C illustrate example backlit button assembly configurations on an inside surface of an aircraft seat arm, arranged in accordance with at least some embodiments described herein. Diagram 100A in FIG. 1A includes an arm portion 104 of an aircraft seat, and a backlit button assembly 106 with an illuminating optical strip 102. Diagram 100B in FIG. 1B includes perspective and front views of another configuration of the backlit button assembly 106 on an inside surface of the arm portion 104 of the aircraft seat with the optical strip 102 implemented in flange form. Diagram 100C in FIG. 1C includes perspective and front views of a further configuration of the backlit button assembly 106 on an inside surface of the arm portion 104 of the aircraft seat with the optical strip 102 implemented in spacer form.

A backlit button assembly as discussed herein may provide status information associated with a vehicle status, a communication network status, a passenger status, and similar ones through color change or flashing. Thus, it may be preferable to have the button assembly at a location on the seat that is visible to the passenger and/or crew of the vehicle (e.g., flight attendants). In some examples, the backlit button assembly 106 may be positioned on an inside surface of the arm portion 104 toward a tip of the arm portion 104 to make it visible to the passenger and/or the vehicle crew.

As discussed in more detail below, some example configurations of the backlit button assembly 106 may include an optical strip or air gap between a touch button and a button frame to provide illumination (selected color and/or flashing pattern). In other example configurations, the optical strip may be around a perimeter of the button frame in a flange form or underneath the button frame in spacer form. In yet other examples, the touch button itself or the button frame may be made from transparent or semi-transparent material and also be used for illumination.

Figure 2A:
FIG. 2A-2C illustrate front views of example backlit button assembly configurations and perspective views of optical strips used in some configurations.
Figure 2A:
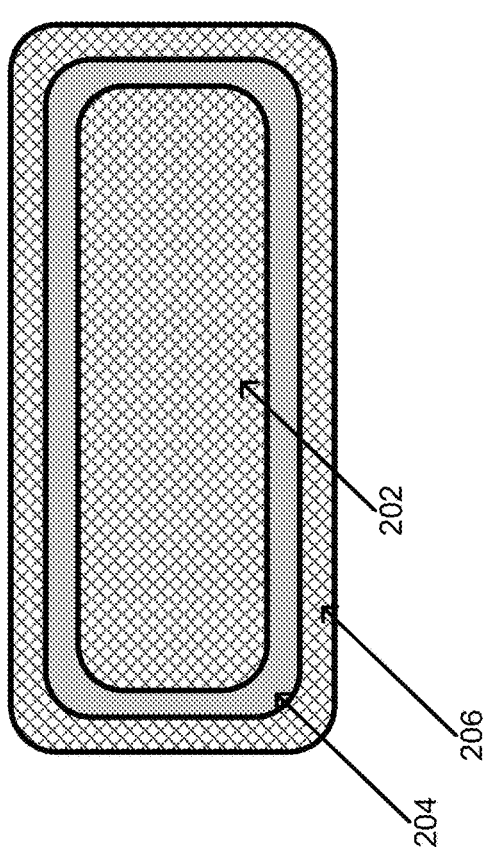
Figure 2B:
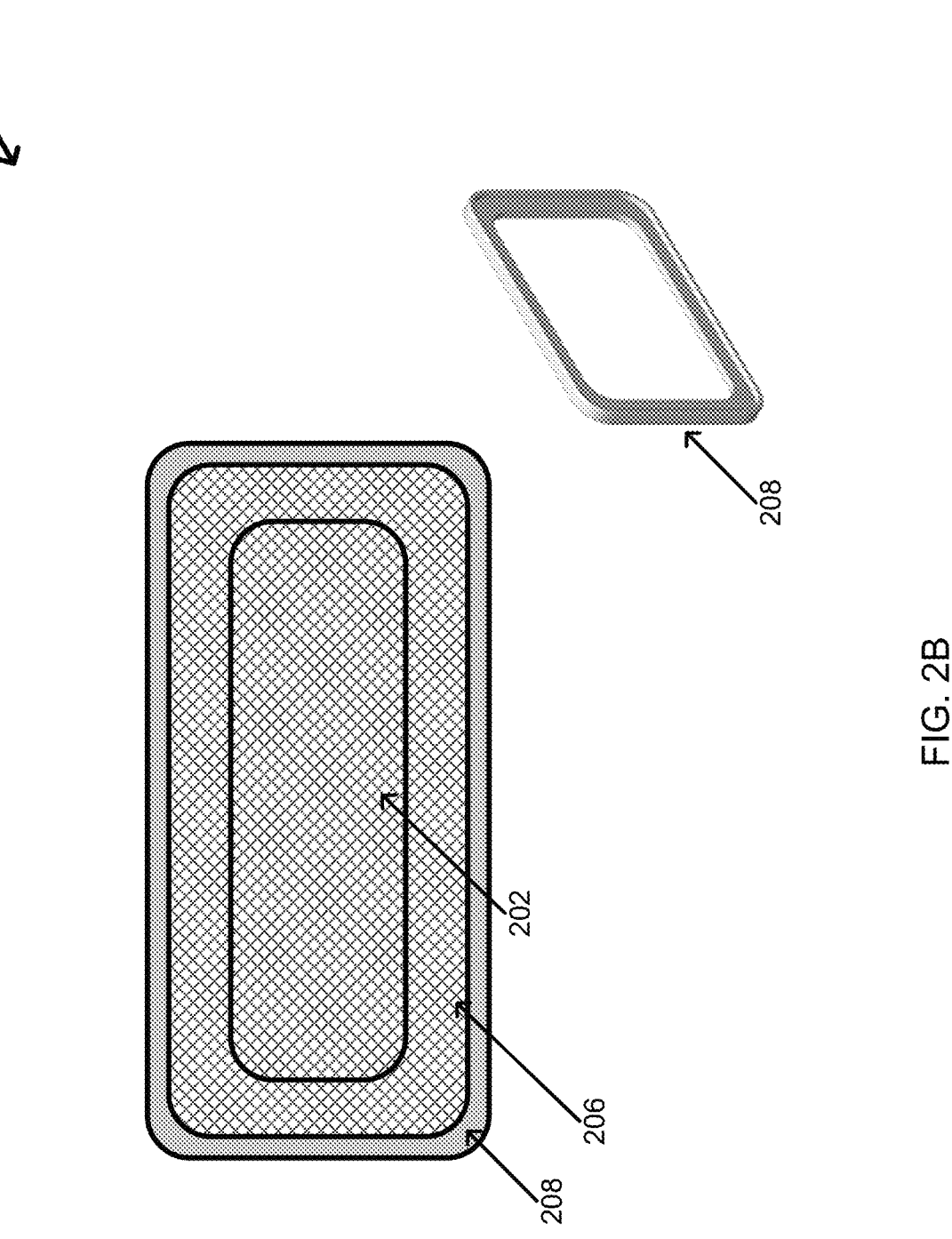
Figure 2C:
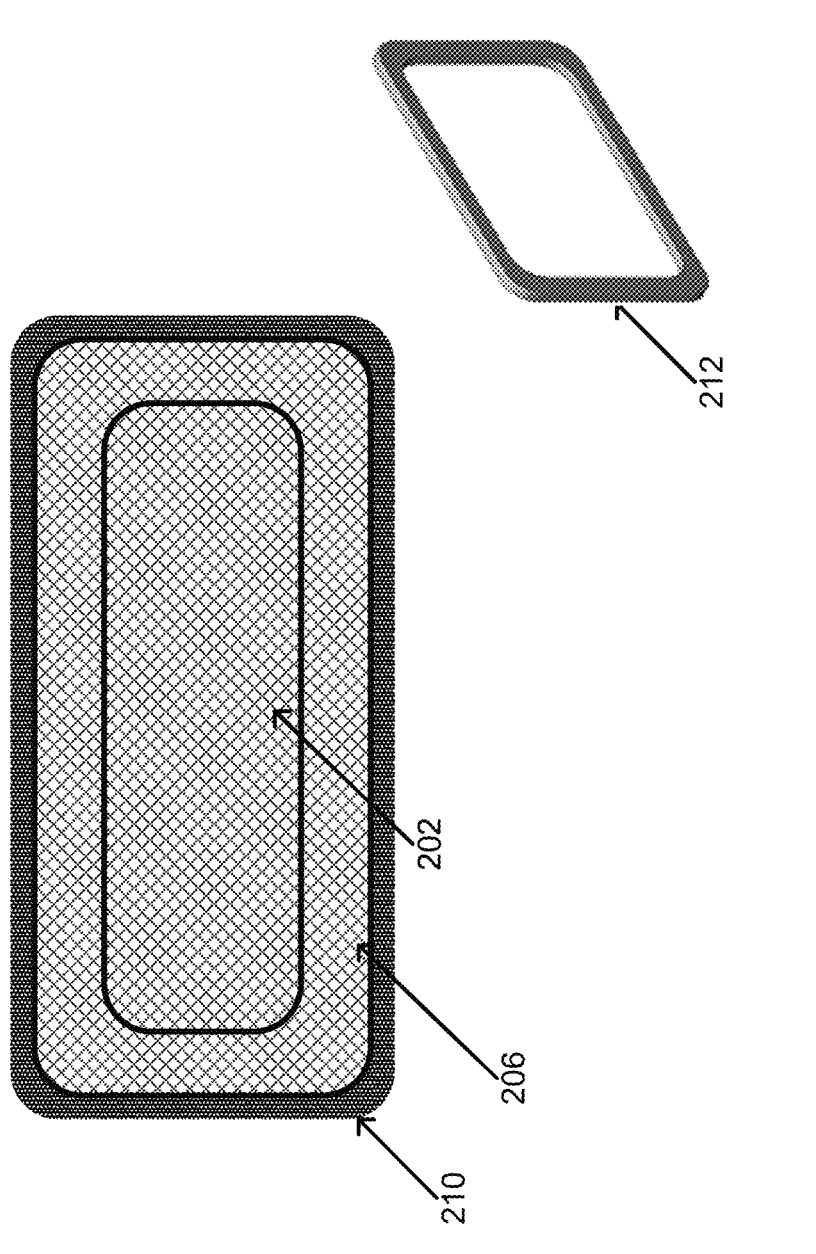

FIG. 2A-2C illustrate front views of example backlit button assembly configurations and perspective views of optical strips used in come configurations, arranged in accordance with at least some embodiments described herein. Diagram 200A in FIG. 2A includes a button frame 206, an optical strip 204, and a push button 202, concentrically arranged. Diagram 200B in FIG. 2B includes the touch button 202 and button frame 206 without the optical strip between the two. The optical strip 208 is arranged to surround the button frame 206 in a flange form such that illumination is provided along a normal of the button assembly surface as well as along an outer edge of the button assembly. Diagram 200C in FIG. 2C includes the touch button 202 and button frame 206 without the optical strip between the two. The optical strip 212 is arranged underneath the button frame 206 in a spacer form such that illumination 210 is provided along the outer edge of the button assembly.

The button frame 206 may be part of the button assembly enclosure, which may house a printed circuit board, components such as a spring mechanism for the push button 202, one or more light sources, and others. The optical strip 204 may be a transparent or semi-transparent optical element (e.g., plastic, glass, or similar) to pass light from the one or more light sources through. The optical strip 204 may surround the push button 202 in some examples. In other examples, the shapes of the push button 202, the optical strip 204, and/or the button frame 20 may be different from the example configuration shown in diagram 200. For example, the components may be circularly shaped, elliptically shaped, or have any other regular or irregular shape. A thickness of the optical strip 204 and sizes of all three components may also vary depending on implementation. In yet other examples, the touch button 202 and the button frame 206 may be separated by an airgap instead of the optical strip. The illumination (light generated by LEDs inside the button assembly, for example) may pass through the airgap instead of the optical strip. The button frame 206 and the push button 202 may be made from any suitable metal, plastic, or composite material.

In some examples, the backlit button assembly may include one or more light sources such as a color changing light emitting diode (LED), multiple different color LEDs, laser diodes, or similar ones. Depending on the status being reflected, an associated color or flashing (e.g., different flashing states or periods) may be selected and proper light source(s) activated. The selection of the color and/or flashing state may be performed at a central controller (e.g., a processor) communicatively coupled to multiple backlit button assemblies in the vehicle or a local controller at or near the backlit button assembly enclosure. The system may also include one or more sensors to detect a seat position, a passenger presence, a vehicle status, etc.

Figure 3:
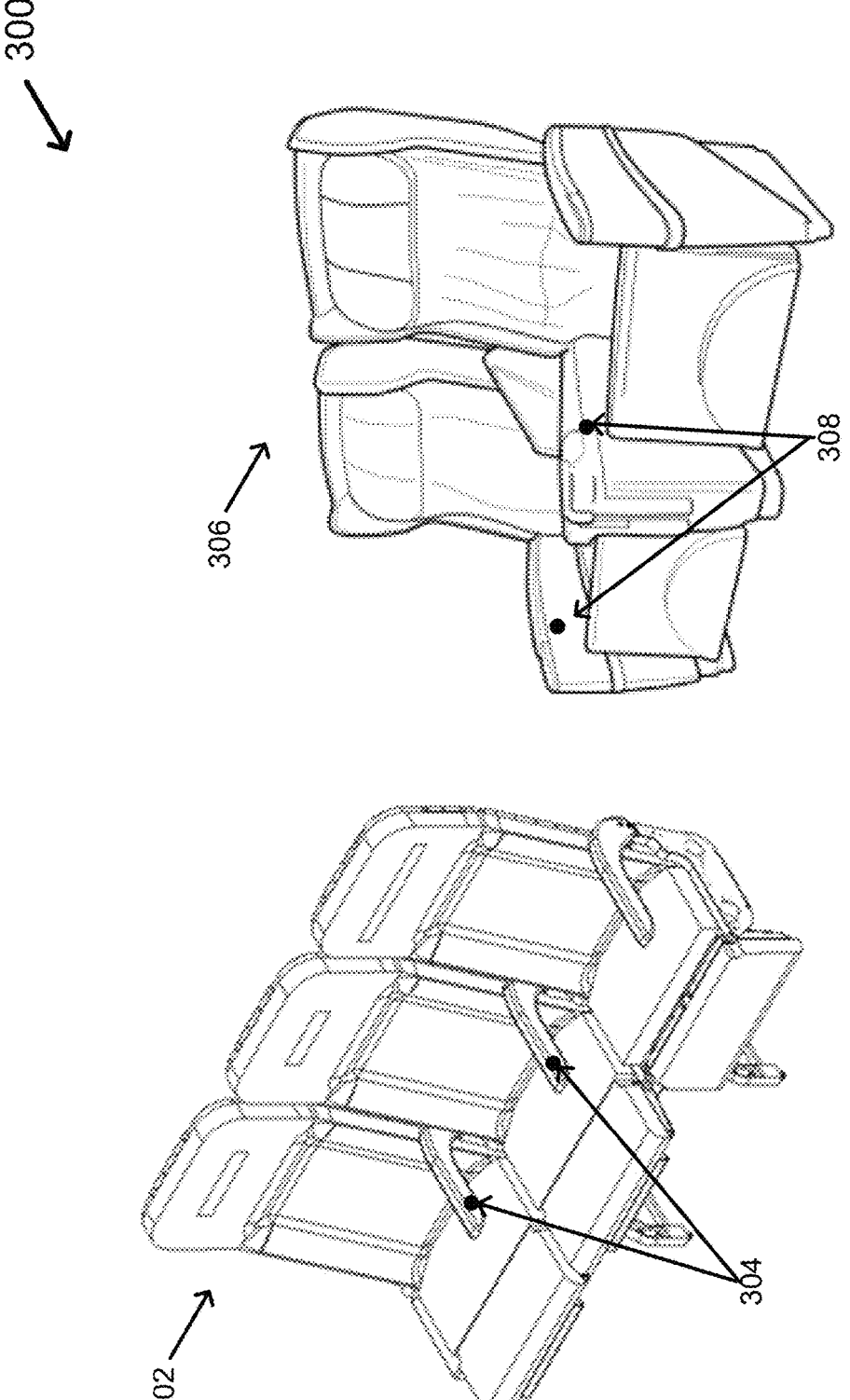
FIG. 3 illustrates various views of aircraft seats with example locations of backlit button assemblies on each seat.

FIG. 3 illustrates various views of aircraft seats with example locations of backlit button assemblies on each seat, arranged in accordance with at least some embodiments described herein. Diagram 300 in FIG. 3 shows a seating arrangement 302 with three seats and another seating arrangement 306 with two seats. Backlit button assemblies 304 and 308 are shown at example locations in the seating arrangements 302 and 306.

Whether the implementation environment is an aircraft, a ship, a train, a bus, or similar vehicle, the seats may have different shapes or sizes and be arranged in various combinations. Depending on the seating arrangement, a location for the backlit button assemblies may be selected for optimum visibility by respective passengers and/or crew members. Inside surfaces of seat arms near a tip of the arm portion may be optimal locations for ease of access and visibility. Embodiments are not limited to seat arm locations, however. In other examples, the backlit button assemblies may be positioned in various other locations such as an interior wall of the vehicle near a seat, a side surface of a back portion of the seat, or other places.

Figure 4:
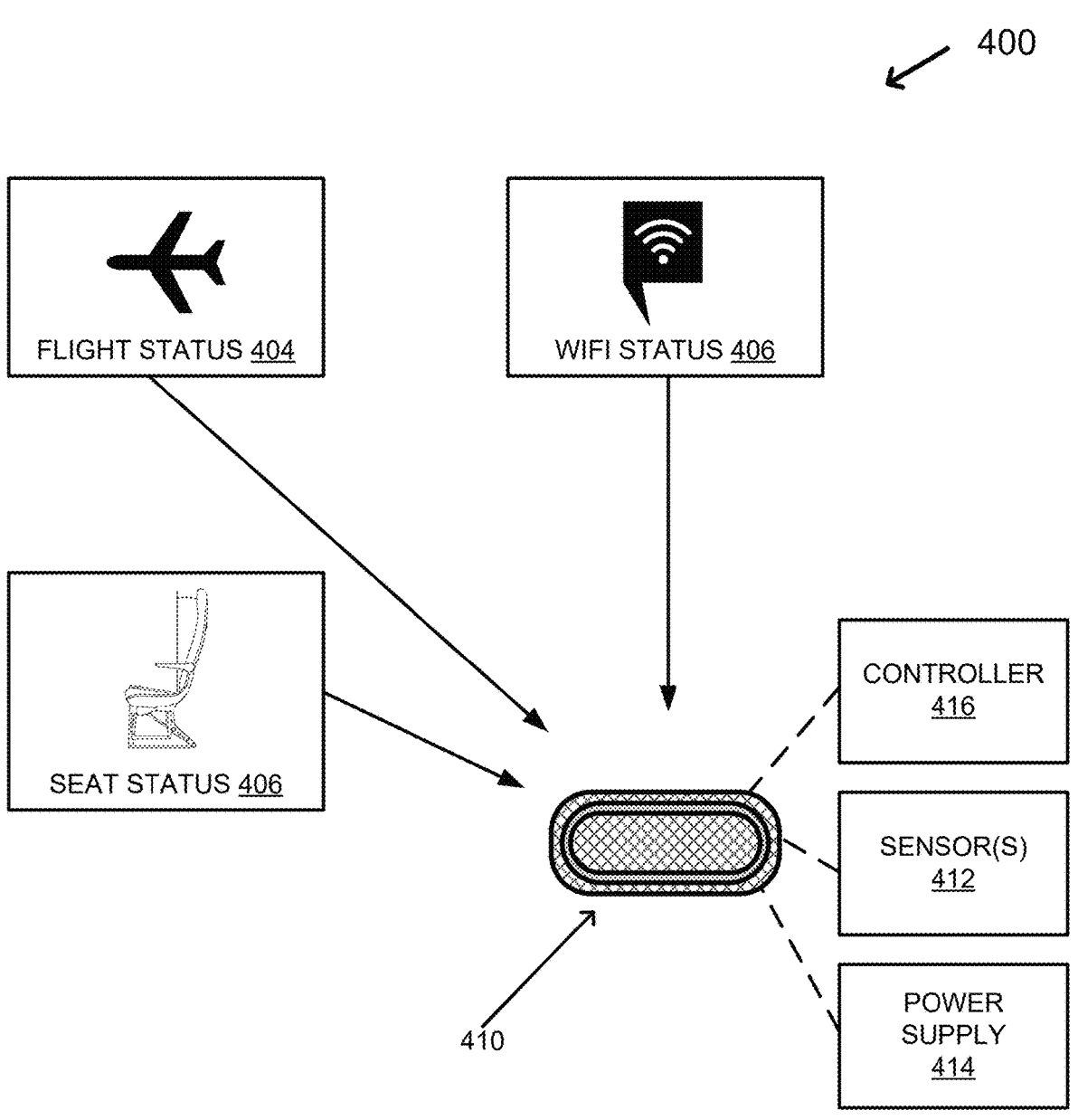
FIG. 4 illustrates a block diagram of example statuses that may be reflected by a backlit button assembly and optional associated components.

FIG. 4 illustrates a block diagram of example statuses that may be reflected by a backlit button assembly and optional associated components, arranged in accordance with at least some embodiments described herein.

Diagram 400 in FIG. 4 shows a backlit button assembly 410, which may be coupled to one or more of a controller 416, sensor(s) 412, and power supply 414 as part of an information presentation system. The backlit button assembly 410 may receive status information associated with seat status 406, flight status 404, communication network (e.g., WiFi) status 406, and others in some examples.

The backlight may help locate the button assembly in a dark environment. The backlight color may help a vehicle operator (e.g., an airline) in creating a desired look to suit interior design and/or comfortable environment. The backlit button assembly positioning may be spaced properly to provide a uniform light flow. The backlighting color may be changed based on multiple factors to convey different status information. In some examples, a color may be presented for take-off and landing when fasten seat belt sign is illuminated, and another color may be presented for in-flight when the fasten seat beat sign is not illuminated based on the flight status 404. In other examples, a communication network (e.g., WiFi) may be activated in the aircraft above a certain altitude. Thus, the backlit button assembly 410 may present two (or more) different colors to convey the operating status of the communication network based on the communication network status 406 information received by the controller 416.

In further examples, seat location sensors may provide information associated with a seat being upright or reclined. For example, in preparation for take-off or landing, if the seat back is in the reclined position, the color could flash indicating to the passenger the seat back needs to be placed in the upright position. This functionality may be extended to change colors to indicate if the seat is upright or in the reclined position providing a color signal to the passenger and the crew identifying the seat position. In yet other examples, as part of the lighting system a sensor may confirm a passenger is seated in the seat and turn on the lighting system, or conversely turn off the lighting system if a passenger is not present in the seat (e.g., a proximity or motion sensor).

The operation of the backlit button assembly 410 with regard to the color and/or flashing state may be performed at a central controller (e.g., a processor) communicatively coupled to multiple backlit button assemblies in the vehicle or a local controller at or near the backlit button assembly enclosure. The system may also be coupled to the one or more sensors 412 to detect a seat position, a passenger presence, a vehicle status, etc. The sensors may be integrated with, nearby, or remote (but electrically coupled to) the backlit button assembly 410.

Figure 5:
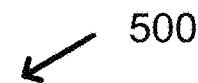
FIG. 5 illustrates an example multi-button, logo-design backlit button assembly, all arranged in accordance with at least some embodiments described herein.

FIG. 5 illustrates an example multi-button, logo-design backlit button assembly, arranged in accordance with at least some embodiments described herein. Diagram 500 shows a backlit multi-button assembly on an inside surface of an arm portion 502 of an aircraft seat. The backlit multi-button assembly may include one or more push buttons 506, 508, 510, and 512 surrounded by a button frame 504. The push buttons 506, 508, 510, and 512 may have any suitable shape and assembled in shape of a logo or similar design (e.g., airline logo for aircraft seats). Depending on desired functionality (e.g., seat recline, crew alert, lighting control, etc.) and a size of the multi-button assembly, any practical number of push buttons and any shapes may be selected. Illumination may be provided through an optical strip between the push buttons and the button frame 506, along edges of the button frame (in flange form or spacer form), or through the buttons or button frame. For example, each of the push buttons may be lit with a different color, or a particular color scheme (e.g., following the airline's color theme) may be used. In other examples, a single push button in shape of a logo or similar design may also be used.

While aircraft environments are used as example implementation environments for a backlit button assembly herein, a backlit button assembly conveying status information through color and/or flashing state may be implemented in other environments such as ships, trains, buses, or even stationary environments such as buildings. Embodiments are also not limited to the shapes, sizes, and configurations of the backlit button assemblies shown herein. Any suitable shape, size, or configuration may be implemented using the principles discussed herein.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. The terminology used herein is for the purpose of describing particular embodiments only and is not intended to be limiting.

The herein described subject matter sometimes illustrates different components contained within, or connected with, different other components. Such depicted architectures are merely examples, and in fact, many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A backlit button assembly comprising:
a button frame coupled to an enclosure;
an optical strip arranged to pass through light;
a push button arranged to activate an operation; and
one or more light sources within the enclosure to provide
    the light with a selected color and/or flashing state
    based on status information associated with a vehicle,
    a passenger, a seat position, or a communication net-
    work operation, wherein
    the backlit button assembly is positioned at an acces-
      sible and visible location on a seat,
    the status information comprises:
      a movement status of the vehicle,
      a presence of the passenger in the seat,
      a seat recline status, or
      a communication network operation status, and
    the optical strip is arranged as one of:
      between the push button and the button frame,
      along a perimeter of the button frame in flange form,
        or
      underneath the button frame in spacer form.

2. The backlit button assembly of claim 1, further comprising:
a controller to receive the status information from a sensor
    or a vehicle subsystem and to control a selection of a
    color of the light or a flashing state of the light.

3. The backlit button assembly of claim 2, wherein the controller is integrated with the enclosure or a remote controller communicatively coupled to the one or more light sources.

4. The backlit button assembly of claim 1, wherein the operation is one of a seat position adjustment, a lighting system control, or a crew alert.

5. The backlit button assembly of claim 1, wherein the vehicle is an airplane, a ship, a train, or a bus.

6. The backlit button assembly of claim 1, wherein the flashing state comprises a flashing pattern or a flashing period.

7. A backlit button assembly for an aircraft passenger seat, the backlit button assembly comprising:
a button frame coupled to an enclosure;
an optical strip arranged to pass through light;
a push button arranged to activate an operation;
one or more light sources within the enclosure to provide
    the light with a selected color and/or flashing state
    based on status information associated with the aircraft,
    a passenger, an aircraft seat position, or an inflight
    communication network operation; and a controller to receive the status information from a sensor
    or an aircraft subsystem and to control a selection of a
    color of the light or a flashing state of the light, wherein
    the backlit button assembly is positioned at an acces-
      sible and visible location on an aircraft seat,
    the status information comprises:
      an altitude of the aircraft,
      a presence of the passenger in the aircraft seat,
      an aircraft seat recline status, or
      an inflight communication network operation status,
        and
    the optical strip is arranged as one of:
      between the push button and the button frame,
      along a perimeter of the button frame in flange form,
        or
      underneath the button frame in spacer form.

8. The backlit button assembly of claim 7, wherein the push button is arranged in shape of a logo or a preselected design.

9. The backlit button assembly of claim 7, wherein the controller is integrated with the enclosure or a remote controller communicatively coupled to the one or more light sources.

10. The backlit button assembly of claim 7, wherein the operation is one of an aircraft seat position adjustment, a lighting system control, or an aircraft crew alert.

11. The backlit button assembly of claim 7, wherein the flashing state comprises a flashing pattern or a flashing period.

12. The backlit button assembly of claim 7, wherein the backlit button assembly is positioned on an inside surface of an arm portion of the aircraft seat near a tip of the arm portion.

13. The backlit button assembly of claim 7, wherein one or more of a shape, a size, a configuration, and a color scheme of the backlit button assembly is selected based on an airline theme.

14. A backlit multi-button assembly comprising:
a button frame coupled to an enclosure;
an optical strip arranged to pass through light;
a plurality of push buttons arranged to activate corre-
    sponding operations;
one or more light sources within the enclosure to provide
    the light with a selected color and/or flashing state
    based on status information associated with an aircraft,
    a passenger, an aircraft seat position, or an inflight
    communication network operation; and
a controller to receive the status information from a sensor
    or an aircraft subsystem and to control a selection of a
    color of the light or a flashing state of the light, wherein
    the backlit multi-button assembly is positioned at an
      accessible and visible location on an aircraft seat,
      and
    the optical strip is arranged as one of:
      between the push button and the button frame,
      along a perimeter of the button frame in flange form,
        or
      underneath the button frame in spacer form.

15. The backlit multi-button assembly of claim 14, wherein the plurality of push buttons is arranged in shape of a logo or a preselected design.

16. The backlit multi-button assembly of claim 14, wherein the corresponding operations comprise one of an aircraft seat position adjustment, a lighting system control, or an aircraft crew alert.

17. The backlit multi-button assembly of claim 14, wherein the status information comprises one of:

an altitude of the aircraft,
a presence of the passenger in the aircraft seat,
an aircraft seat recline status, or
an inflight communication network operation status.

* * * * *